United States Patent [19]

Clasen et al.

[11] Patent Number: 4,681,614
[45] Date of Patent: Jul. 21, 1987

[54] METHOD OF MANUFACTURING GLASS BODIES

[75] Inventors: Rolf Clasen; Heinz Scholz, both of Aachen, Fed. Rep. of Germany

[73] Assignee: U.S. Philips Corporation, New York, N.Y.

[21] Appl. No.: 839,250

[22] Filed: Mar. 13, 1986

[30] Foreign Application Priority Data

Mar. 29, 1985 [DE] Fed. Rep. of Germany ....... 3511439

[51] Int. Cl.$^4$ ........................................... C03B 37/016
[52] U.S. Cl. ........................................ 65/18.1; 65/2; 65/3.11; 65/3.12; 65/900; 65/901; 65/17; 156/DIG. 108; 264/65; 501/12
[58] Field of Search .................... 65/2, 3.11, 3.12, 17, 65/18.1, 18.3, 18.4, DIG. 16, 900, 901; 501/12; 156/DIG. 108; 264/65

[56] References Cited

U.S. PATENT DOCUMENTS 4,574,063  3/1986  Scherer ........................... 65/18.1 X

FOREIGN PATENT DOCUMENTS 0029590  6/1981  European Pat. Off. .............. 501/12

Primary Examiner—Robert L. Lindsay
Attorney, Agent, or Firm—Norman N. Spain

[57] ABSTRACT

A method of manufacturing glass bodies, in which the starting material for the glass body, in the form of microdispersed $SiO_2$ particles, is used to form an open-pore green body which is subjected to a cyclic purification process in which the impurities present in the green body react with a purifying gas which is heated to a temperature in the range from 600° to 900° C., after which the green body is sintered; in each cycle of the said process, the arrangement holding the green body to be purified being flushed and subsequently evacuated.

5 Claims, No Drawings

METHOD OF MANUFACTURING GLASS BODIES

The invention relates to a method of manufacturing glass bodies, in which the starting material for the glass body, microdispersed $SiO_2$ particles, is used to form an open pore green body which is subjected to a purification process in which the impurities present in the green body react with a purifying gas which is heated to a temperature in the range from 600° to 900° C., after which the green body is sintered.

The invention further relates to the use of the glass bodies manufactured by the method in accordance with the invention.

The method mentioned in the opening paragraph is particularly suitable for the manufacture of preforms for optical waveguides.

Types of quartz glass which are substantially free of impurities and, in particular, substantially anhydrous are not only required for the manufacture of optical waveguides but also for the manufacture of lamp envelopes, particularly halogen lamps or gas discharge lamps. Manufacturing such types of glass in a conventional way, i.e. from a glass melt, has its restrictions because the degree of impurification is too high especially due to the presence of water in the glass matrix. For this reason, very pure types of glass were manufactured by sintering porous green bodies from very small quartz-glass particles whose size is in the range from 1 to 500 nm. As the green bodies are porous and, consequently, gas permeable, they can be subjected to a purification step in a gas atmosphere which is heated to a temperature of from 600° to 900° C. and which reacts with the impurities present, after which they are sintered to form transparent glass at temperatures of approximately 1500° C. Undesired impurities are, for example, OH ions and ions and particles of transition metals.

Such green bodies can be formed from suspensions through a sol-gel transformation, however, it is also possible to produce porous green bodies from a powdered starting material for glass, for example, by centrifuging the starting material and subsequently stabilising the shape.

German Patent Specification No. DE 3240355 describes a method of manufacturing glass bodies which are to be used as preforms for the manufacture of optical fibres, in which method dry glass particles are deposited on the inner surface of a centrifuge by means of centrifugal forces. According to this specification, the solid particles which one introduced in the form of dry loose-textured material are forced against the inner surface of a supporting body by centrifugal forces. The loose-textured body is subsequently shape-stabilised at its periphery by applying heat and/or by applying solidifying adhesives.

The loose-textured bodies (green bodies) thus obtained are subjected to a purification process; as the loose-textured bodies are gas permeable, their properties may be altered by chemical treatment using gaseous substances, in particular a reduction of the OH content is required because in the infrared spectrum range OH ions, for example, restrict the transmission of an optical waveguide. In order to remove OH ions, the shape-stabilised loose-textured body is exposed to an atmosphere of chlorine gas or to a helium/chlorine-gas mixture in a closed vessel at temperatures of 600° to 900° C. for up to 5 hours (depending on the size of the loose-textured body and the desired purity of the glass body). Thus, it should be possible to reduce an initial OH content of approximately 200 ppm to 0.1 ppm.

However a disadvantage of this method is that obtaining a glass body of a high purity requires a relatively long purification time, especially in the event of large-scale processes, such as has been employed recently for the manufacture of optical waveguides, thus increasing the cost. Such a purification process becomes problematic also when the green body has a high density, as is required for a perfect, subsequent sintering process. If a body is already microdispersed in its green state, this will result in a reduced pore-volume and an increased diffusion time, such that the purification process will take up a lot of time while even being incomplete in the case of green bodies having large cross-sections.

It is an object of the invention to so improve the method mentioned in the opening paragraph so that very porous green bodies for the manufacture of glass bodies can be obtained, and that the time needed for the purification process is substantially reduced.

This object is achieved in accordance with the invention, by subjecting the green body to be purified to a cycle purification process, such that the container which holds the green body to be purified is flushed with a purification gas and then sealed, after which the container is evacuated until the gases present in the open-pore green body in the form of purification gas and gaseous reaction products are removed, and repeating this cycle until a sufficiently small concentration of impurities is obtained through the entire cross-section of the green body.

In accordance with an advantageous embodiment of the method in accordance with the invention, an amount of purification gas is introduced for each cycle, which is larger than the pore volume of the green body to be purified. Thus, it is ensured that in each cycle the entire pore volume of the open-pore green body can be filled with purification gas.

In accordance with additional advantageous modified embodiments of the method in accordance with the invention, the cycles have a flushing time:evacuation time ratio in the range from 1:1 to 20:1, the preferred ratio being 5:1 with a flushing time of 2.5 min and an evacuation time of 30 s.

In only 1 hour time, a green body of such high purity is obtained that the glass body sintered from this green body has a water concentration 10 ppb through its entire cross-section.

A green body which was manufactured in the same way as the one which was purified in accordance with the present method, except that it was purified in accordance with the known state of the art by heating in a helium/chlorine-gas atmosphere in a closed arrangement at a temperature of 900° C. for 4 hours, exhibited after sintering a water concentration of 2 ppm at its periphery and of 80 ppm in the centre, the density of the green body being 45% of the density of compact quartz glass. The advantages obtained by means of the invention are, in particular, that after a relatively short purification process very pure, reproducible green bodies for the manufacture of quartz-glass bodies can be obtained, even if the green bodies to be purified are microdispersed and porous.

The invention will now be described by way of an example of an embodiment. A green body was formed in a mould by subjecting $SiO_2$ particles having a particle diameter in the range from 10 to 100 nm, the majority having a diameter of 40 nm, to centrifugal forces. For this purpose, 200 g of microdispersed $SiO_2$ powder were mixed with 300 cm$^3$ of an aqueous 0.5% ammonia solution and dispersed by subjecting the mixture to ultrasonics at a frequency f of 35 kHz. The resultant suspension was subjected to centrifugal forces in a large laboratory centrifuge at 10,000 g for 15 minutes, the clear solution was decanted and the sediment was dried in 24 hours, while being heated in a manner such that a temperature of 120° C. was reached in 23 hours, to which temperature the sediment was subjected for 1 hour. Green bodies having a diameter of 25 mm and a density of 51% of the density of quartz glass were obtained. These green bodies were purified in an oven at a temperature of 900° C. for 1 hour, in which purification process the oven was flushed for 2.5 minutes with an $O_2$ gas stream of $10^{-3}$ m$^3$/min (under normal conditions) and a $Cl_2$ gas stream of $10^{-5}$ m$^3$/min (under normal conditions), after which the oven was evacuated for 30 seconds. Thus, a filling time:evacuation time ratio of 5:1 is obtained. This cycle was repeated for 1 hour. The green body thus purified was subsequently sintered at a temperature of 1500° C. in a helium atmosphere to which 2% by volume of chlorine gas was added, the green body being led through the oven at a speed of 3 mm/min. A transparent glass rod free from bubbles and reams and having a diameter of 20 mm and containing 10 ppb of impurities through the entire cross-section was obtained. The quartz-glass body obtained had a density of 2.20 9/cm$^3$ and a refractive index $n_D$ of 1.4598.

The very pure types of quartz glass manufactured by the present method can advantageously be used for the manufacture of optical waveguides. They may additionally be used for the manufacture of lamp envelopes for halogen lamps or gas-discharge lamps as these types of glass like the types of glass used for optical waveguides must be substantially anhydrous and exhibit a high silicon-dioxide content.

What is claimed is:

1. In a method of manufacturing glass bodies in which a starting material for the glass body, in the form of microdispersed $SiO_2$ particles, is used to form an open-pore green body, this green body is subjected to a purification process treatment with a purifying gas reactible with impurities present in the green body, the improvement wherein the green body to be purified is positioned in a sealable container, the container containing said green body is flushed with a purification gas and is then sealed, the green body is heated to a temperature of 600°–900° C. while in said container, the container is evacuated to remove said purification gas and gaseous reaction products from said container and repeating said steps of flushing said green body with a purification gas, heating said body while in contact with said purification gas and evacuating said purification gas and gaseous reaction products from said container are repeated the number of times necessary to provide the green body with a sufficiently small concentration of impurities throughout its entire cross section.

2. A method as claimed in claim 1, wherein in each cycle, the amount of purification gas introduced to flush the green body exceeds the pore volume of the green body to be purified.

3. A method as claimed in claim 1, wherein the cycles have a flushing time:evacuation time ratio in the range from 1:1 to 20:1.

4. A method as claimed in claim 3, wherein the ratio is 5:1, the flushing time is 2.5 min and the evacuation time is 30 s.

5. A method as claimed in claim 1, wherein a gas mixture of $O_2$ to which $Cl_2$ in an amount of from 0.1 to 10% by volume has been added, is used as a purification gas.

* * * * *

UNITED STATES PATENT AND TRADEMARK OFFICE
CERTIFICATE OF CORRECTION

PATENT NO. : 4,681,614

DATED : July 21, 1987

INVENTOR(S) : ROLF CLASEN ET AL

It is certified that error appears in the above-identified patent and that said Letters Patent is hereby corrected as shown below:

Column 4, line 16, delete "repeating".

Signed and Sealed this

First Day of March, 1988

Attest:

DONALD J. QUIGG

Attesting Officer

Commissioner of Patents and Trademarks